Figure 1:
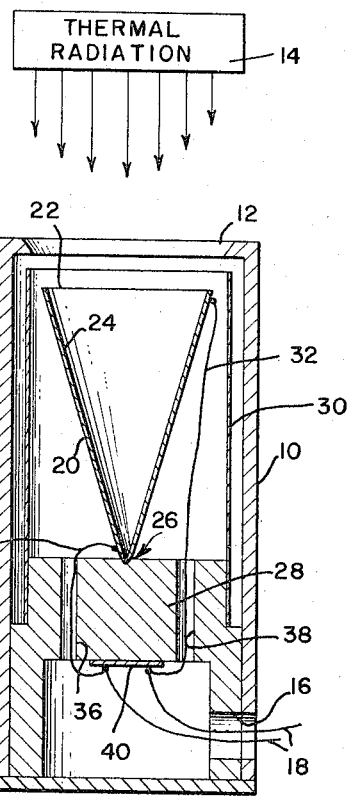

Feb. 6, 1968 R. P. CLIFFORD 3,368,076
CONICAL RECEIVER FOR THERMAL RADIATION
Filed Aug. 18, 1965

Richard P. Clifford,
INVENTOR.
BY.
Joseph Dwyer
ATTORNEY.

United States Patent Office 3,368,076
Patented Feb. 6, 1968

3,368,076
CONICAL RECEIVER FOR THERMAL
RADIATION
Richard P. Clifford, Tarzana, Calif., assignor to TRW Inc., Redondo Beach, Calif., a corporation of Ohio
Filed Aug. 18, 1965, Ser. No. 480,693
8 Claims. (Cl. 250—83.3)

This invention relates in general to radiant heat energy measuring devices or radiometers, and in particular to a new and improved conical cavity radiometer which incorporates thermal conduction means to establish thermal equilibrium of the receiver as distinguished from establishing thermal equilibrium solely by reradiation.

It is a principal object of this invention to provide a conical cavity radiometer which emits a stable signal in response to the intensity of thermal radiation and one which is substantially insensitive to ambient temperatures.

Conical cavity radiometers and their characteristic advantages to measure thermal radiation are, of course, well known. These generally comprise a hollow cone open at its base and mounted in such a manner that the inner side walls are exposed to the source of radiant energy so as to absorb the radiant energy and dissipate the same essentially by reradiation or by convection if the cone is in an unevacuated cell. Thus, when the conical cavity is exposed to a source of radiation, the cone will reach a thermal balance between the energy absorbed from the source and the energy dissipated by the cone, and the temperature reached by the cone is a measure of the intensity of the radiant source. Means are provided in these prior art devices for measuring the temperature of the cone and indirectly the temperature of the radiant source and usually comprise thermocouples or thermistors located usually midway between the base and the apex of the cone to pick up the temperature of the cone. Another prior art device uses as its means to measure the temperature of the cone the expansion and contraction of the material comprising the cone element itself. In this latter device the rim which forms the apex of the hollow cone is rigidly mounted and the apex is free to move in response to the expansion and contraction of the walls of the cone. The position of the apex then is a function of the temperature of the cone element and its position can signify temperature or be used to open valves, close switches, and the like.

These prior art conical cavity radiometers, however, operating on the principle of radiation of the energy absorbed and the energy dissipated, are necessarily quite sensitive to the ambient temperature for the reason that the energy dissipated by radiation will depend upon the temperature difference between the cone and the ambient temperature of the surroundings. Thus, it can be appreciated that the prior art radiometers being quite sensitive to ambient environment are thus subject to error unless the ambient temperature of the surroundings or housing is carefully regulated.

This invention is substantially insensitive to the ambient temperature of the housing for the reason that the energy dissipation by the cone is by conduction as distinguished from radiation and hence is relatively independent of the ambient temperature. In this radiometer the conical wall is connected to a heat sink at the apex of the cone and the rim forming the base thereof is free of any connection to the housing in which the cone is mounted. This apex-mounted cone incorporates a significant thermal conduction path between the apex and the heat sink so that a temperature gradient is established between the base rim of the cone and its apex. Thus, energy absorbed by the cone is conducted to the heat sink and a temperature difference is established between the cone base rim and the cone apex. This temperature differential can then be measured by any suitable means which is capable of measuring the difference in temperature between the cone base rim and the heat sink which in turn, of course, is a function of the intensity of the radiation from the radiant source.

Accordingly, still another object of this invention is the provision of an apex-mounted conical cavity radiometer which utilizes conduction between the base rim and a heat sink at the cone apex to establish a temperature gradient, which gradient is a function of the intensity of the source radiant energy.

Still another object of this invention is to provide a conical cavity radiometer which is simple and small sized, yet will provide signals of practical amplitude.

Figure 2:
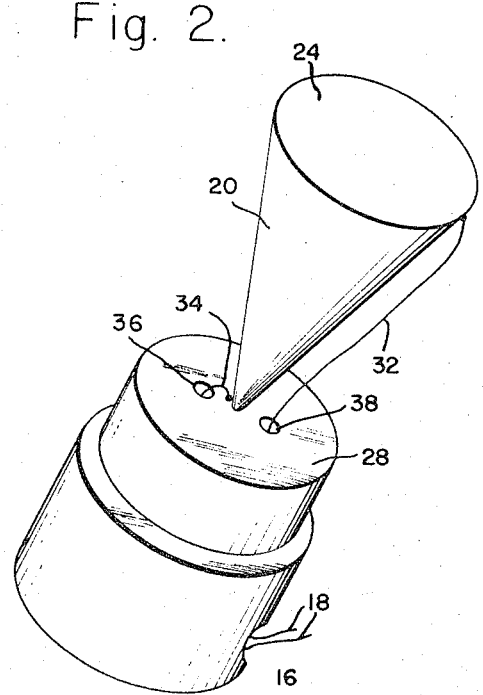

Other objects and advantages of this invention will become apparent to those skilled in the art upon considering the following detailed description and drawings which form a part thereof and wherein:

FIGURE 1 is a perspective view of the apex-mounted cone shown with part of its heat sink but without its instrument housing; and FIGURE 2 is a cross-sectional view of the radiometer in its instrument housing.

Referring now to the drawings, the conical cavity radiometer comprising this invention is shown mounted in a hollow cylindrical instrument housing 10 which is provided with an aperture 12 to expose the contents of the housing to a source of thermal radiation indicated schematically at 14. Housing 10 is also provided with an aperture 16 shown adjacent the end of the housing opposite the aperture 12 through which suitable lead wires 18 extend to connect the instrument to a suitable readout device (not shown).

Instrument housing 10 encloses a conical element 20 open at its base 22 to expose the inner side wall forming the conical cavity to the radiant energy source 14 through the housing aperture 12. Cone apex 26 is attached to a heat sink 28 in any suitable manner, such as by soldering, to form a conduction path between the metallic inner walls 24 and the heat sink 28, and to form the sole attachment between the cone element and the instrument housing 10. In the preferred embodiment of this invention the conical walls are thin and are formed of a metallic foil, and blackened on the inner wall thereof for maximum absorption of the thermal radiation and are preferably aluminized on the exterior thereof to minimize radiation. In addition, to further minimize radiation of the energy absorbed by the cavity wall 24, the instrument is provided with an aluminized cylindrical radiation shield 30 open at the end to permit radiation to end of the cone and spaced from the cone 20 and from the inner walls of the housing 10. Too, the location of the cone and the shield 30 serves to shield the heat sink 28 from source of thermal radiation.

From the foregoing it can be seen that radiation absorbed by the walls 24 is readily conducted towards the apex 26 and by so incorporating a significant thermal conduction path between the apex and the heat sink (the latter being of large mass to dissipate energy), a temperature gradient is established between the cone base rim 22 and its apex 26. Thermal equilibrium is thus established essentially by metallic conduction and only incidentally by reradiation, thus making the temperature gradient of the cone relatively independent of the housing temperature.

The temperature difference established between the apex 26 and the rim 22 can be measured in any suitable way. In the embodiment illustrated, thermocouple wire 32 is affixed adjacent the rim 22 in any suitable manner, as by spot soldering, and thermocouple wire 34 is attached near the apex 26 by this same soldering technique. The wires 32 and 34 are then each connected to the lead wires 18 on the side of the heat sink 28 opposite the connection to the apex 26 through the respective apertures 36 and 38 to form an isothermal connection adjacent the area 40. The purpose of this isothermal connection is merely to simplify the connection between the leads 18 and the thermocouple wires 32 and 34.

As a further refinement of this invention the material selected for the cone in addition to being heat conductive is also preferably of the type which produces an EMF when the thermocouple wires 32 and 34 are attached thereto such as for example, Cupron, or Constantan. This eliminates the necessity of having two wires for each thermocouple attached to the rim and apex of the cone and permits the cone itself to act as the common thermocouple wire would normally act.

It should be noted, too, that as shown in the drawing wire 34 is attached near (rather than precisely at) the apex 32 simply to show the temperature differentials between the rim and apex can be measured whether the wire 34 were located at the apex or near the apex or on the heat sink itself for that matter. Thus, when the connection of wire 34 is stated herein to be "at the apex" or "near the apex," these expressions mean the connection is located where a temperature differential between the rim and that part of the device in the vicinity of the apex can be measured. Too, while the cone angle is shown to be approximately 30°, the angle experimentally shown to be the most efficient for absorption of thermal radiation, other cone angles could also be used.

From the foregoing it can be seen that this invention provides a simple conical receiver which utilizes the conduction between its side wall to a heat sink to establish a temperature differential between the cone base rim and the cone apex and since conduction is the means of dissipating the energy absorbed by the side wall 24, it is relatively independent of the ambient temperature. While the instrument housing is shown in cylindrical form, any suitable configuration will suffice and while thermocouples have been disclosed as the means of measuring the temperature differential between the rim 22 and the apex 26, any suitable means may be used, such as a thermistor, or a resistance gauge, or multiple junction thermocouples (thermopiles).

Finally it should be mentioned that in an actual conical receiver constructed according to the teachings of this invention comprising 0.001 cupron having a cone angle of 30° and a base aperture of 0.5 inch, and with thermocouples comprising chromel wires attached to the rim and to the heat sink in a brass instrument housing with a radiation shield and measured at ambient temperature of 75° F., the output of the thermocouple showed a linear response in the range of flux density of the radiation source from 60 watts to 180 watts per square foot from 2 millivolts to 6 millivolts, so that the temperature of the radiation source could be easily calibrated linearly.

The embodiments of the invention in which an exclusive property or privilege is claimed are defined as follows:

1. A receiver to measure thermal radiation comprising:
   a hollow thin-walled cone of heat conductive material having the base open to expose its conical cavity to a source of thermal radiation;
   a heat sink attached to said cone at its apex, the walls of said cone providing conduction between the walls of said conical cavity and said heat sink so that a temperature differential is produced between the rim of said cone and said heat sink; and
   means connecting the rim and said apex to transduce the radiant energy to an electrical signal.

2. The receiver claimed in claim 1 wherein the inner cavity walls of said cone are blackened to maximize absorption of radiation and the exterior walls of said cone are aluminized to minimize radiation.

3. A receiver to measure thermal radiation comprising:
   a housing;
   a hollow thin-walled cone in said housing, said cone being of heat conductive material having the base open to expose its conical cavity to a source of thermal radiation;
   a heat sink attached to said housing and attached to said cone at its apex, the walls of said cone providing conduction between the walls of said conical cavity and said heat sink so that a temperature differential is produced between the rim of said cone and said heat sink; and
   means connecting the rim and said apex to transduce the radiant energy to an electrical signal.

4. The receiver claimed in claim 3 wherein the inner cavity walls of said cone are blackened to maximize absorption of radiation and the exterior walls of said cone are aluminized to minimize radiation.

5. The receiver claimed in claim 3 wherein a heat shield is disposed between said cone and said housing to minimize radiation.

6. A receiver to measure thermal radiation comprising:
   a hollow thin-walled cone of heat conductive material having the base open to expose its conical cavity to a source of thermal radiation;
   a heat sink attached to said cone at its apex, the walls of said cone providing conduction between the walls of said conical cavity and said heat sink so that a temperature differential is produced between the rim of said cone and said heat sink;
   a housing enclosing said cone and apex, said apex being fixedly connected to said housing and being the sole connection between said housing and said cone; and
   means connecting the rim and said apex to transduce the radiant energy to an electrical signal.

7. The receiver claimed in claim 6 wherein the inner cavity walls of said cone are blackened to maximize absorption of radiation and the exterior walls of said cone are aluminized to minimize radiation.

8. The receiver claimed in claim 6 wherein a heat shield is disposed between said cone and said housing to minimize radiation.

References Cited
UNITED STATES PATENTS 3,188,473   6/1965   Bates et al. ---------- 250—83.3

RALPH G. NILSON, *Primary Examiner.*

S. ELBAUM, *Assistant Examiner.*